US010226888B2

(12) United States Patent
Kajita et al.

(10) Patent No.: US 10,226,888 B2
(45) Date of Patent: Mar. 12, 2019

(54) KNEADING APPARATUS

(71) Applicant: TOYOTA JIDOSHA KABUSHIKI KAISHA, Toyota-shi (JP)

(72) Inventors: Naoya Kajita, Toyota (JP); Junji Asano, Kariya (JP); Shota Nagashima, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 225 days.

(21) Appl. No.: 15/091,958

(22) Filed: Apr. 6, 2016

(65) Prior Publication Data

US 2016/0288370 A1    Oct. 6, 2016

(30) Foreign Application Priority Data

Apr. 6, 2015    (JP) ................... 2015-078035
Feb. 12, 2016    (JP) ................... 2016-025216

(51) Int. Cl.
  *F16J 9/14*    (2006.01)
  *B29C 45/53*    (2006.01)
  *B29C 45/58*    (2006.01)

(52) U.S. Cl.
  CPC ............ *B29C 45/531* (2013.01); *B29C 45/53* (2013.01); *F16J 9/14* (2013.01); *B29C 45/581* (2013.01);
  (Continued)

(58) Field of Classification Search
  CPC ........ B29C 2045/536; B29C 2045/583; B29C 45/581; B29C 45/53; B29C 45/586; B29C 45/531; F16J 9/14
  (Continued)

(56) References Cited

U.S. PATENT DOCUMENTS 2,569,777 A  * 10/1951 Phillips ............... F16J 9/14
                                                    277/499
3,015,451 A  *  1/1962 Goeser ................ B02C 17/18
                                                    241/172

(Continued)

FOREIGN PATENT DOCUMENTS

JP         44-1875 Y     1/1969
JP         54-13990 U1    1/1979

(Continued)

OTHER PUBLICATIONS

Japanese Office Action dated Jan. 23, 2018 in Japanese Patent Application No. 2016-025216 (submitting partial English translation only), 2 pages.

*Primary Examiner* — Philip C Tucker
*Assistant Examiner* — Jimmy R Smith, Jr.
(74) *Attorney, Agent, or Firm* — Oblon, McClelland, Maier & Neustadt, L.L.P.

(57) ABSTRACT

Agitating pins employed in a kneading apparatus extend in the horizontal direction and rotate around a rotation axis of an agitator extending in the horizontal direction, so that the kneading apparatus can repeat a process in which a material is kneaded and beaten against an inner wall surface of a kneading vessel and the material adhering to the inner wall surface of the kneading vessel, especially on the upper side from the rotation axis of the agitator, falls under its own weight through the clearance between the agitating pins. As a result, the material hardly adheres to the inner wall surface of the kneading vessel, so that the kneading efficiency can be enhanced.

6 Claims, 9 Drawing Sheets

(52) U.S. Cl.
CPC .. *B29C 2045/536* (2013.01); *B29C 2045/583* (2013.01)

(58) Field of Classification Search
USPC ............. 425/200, 207, 209; 366/325.4, 267; 277/497, 499
See application file for complete search history.

(56) References Cited

U.S. PATENT DOCUMENTS

| | | | | |
|---|---|---|---|---|
| 3,482,823 A | * | 12/1969 | Rechtin | B01F 7/30 366/245 |
| 3,712,593 A | * | 1/1973 | Szatmari | B01F 5/223 366/7 |
| 3,844,699 A | * | 10/1974 | Maxwell | B29C 45/53 425/207 |
| 2002/0105856 A1 | * | 8/2002 | Terentiev | B01F 7/0005 366/262 |

FOREIGN PATENT DOCUMENTS

| | | |
|---|---|---|
| JP | 6-31378 | 2/1994 |
| JP | 2000-262881 | 9/2000 |
| JP | 2007-290384 | 11/2007 |

\* cited by examiner

KNEADING APPARATUS

INCORPORATION BY REFERENCE

The disclosure of Japanese Patent Application No. 2015-078035 and 2016-025216 filed on Apr. 6, 2015 and Feb. 12, 2016 including the specification, drawings and abstract is incorporated herein by reference in its entirety.

BACKGROUND OF THE INVENTION

1. Field of the Invention

The present invention relates to a kneading apparatus that is used to knead molding sand etc.

2. Description of Related Art

A technology related to such a field is described in Japanese Patent Application Publication No. 6-31378. To perform a kneading process with the kneading apparatus described in this publication, an outer shell container is moved upward and silica sand is fed into the outer shell container through a chute. Thereafter, a specified amount of curing agent is poured into the outer shell container while an agitating blade disposed inside the outer shell container is being rotated at a predetermined speed. Then, the silica sand and the curing agent are kneaded together while the agitating blade is being rotated. After kneading, the outer shell container is turned over to feed the kneaded sand into a sand feeding chute, and the kneaded sand is packed into a core mold through the sand feeding chute to mold a core.

Since the agitating blade used in the above kneading apparatus rotates around a rotation axis extending in the vertical direction, due to the centrifugal force, the kneaded sand easily adheres to the wall surface of the outer shell container, which reduces the kneading efficiency.

SUMMARY OF THE INVENTION

The present invention provides a kneading apparatus with enhanced kneading efficiency.

An aspect of the present invention relates to a kneading apparatus comprising: a kneading vessel; and an agitator configured to be rotatably supported inside the kneading vessel to knead a material inside the kneading vessel, the agitator having a plurality of agitating pins that rotate around a rotation axis of the agitator extending in a horizontal direction and that extend in parallel to the rotation axis of the agitator inside the kneading vessel. The horizontal direction of the present invention includes a direction slightly inclined respect to the complete horizontal direction.

Since the agitating pins employed in this kneading apparatus extend in the horizontal direction and rotate around the rotation axis of the agitator that extends in the horizontal direction, the kneading apparatus can repeat a process in which a material is kneaded and beaten against the inner wall surface of the kneading vessel and the material adhering to the inner wall surface, especially on the upper side in the direction of gravity from the rotation axis of the agitator, falls under its own weight through the clearance between the agitating pins. As a result, the material hardly adheres to the inner wall surface of the kneading vessel, so that the kneading efficiency can be enhanced.

The kneading apparatus may further comprises an injection mold adjacent to the kneading vessel; an injection piston disposed inside the kneading vessel; and a driving device that moves the injection piston along the agitating pins to extrude the material inside the kneading vessel in the horizontal direction toward the injection mold. The agitating pins may penetrate the injection piston. If such a configuration is adopted, it is possible to inject the material directly into the injection mold without opening the kneading vessel, so that the material is hardly exposed to external air and the material can be prevented from drying. It is also possible to reduce the molding time.

The kneading apparatus may further comprise a seal member that is disposed between the injection piston and an inner wall surface of the kneading vessel and fitted in the injection piston. Ends of the seal member facing each other in a circumferential direction may be engaged with each other. The ends of the seal member each may have a tapered portion that inclines in the opposite direction from a rotation direction of the injection piston as extending toward a space where the material is kneaded in the kneading vessel. If such a configuration is adopted, the material being likely to enter the gap between the outer peripheral surface of the injection piston and the inner wall surface of the kneading vessel is pushed back toward the side of an injection port by the rotary force of the injection piston and the tapered portion of the seal member. Thus, it is possible to prevent the material from entering the gap between the outer peripheral surface of the injection piston and the inner wall surface of the kneading vessel. Accordingly, damage to the injection piston can be prevented.

The plurality of agitating pins may be arrayed in an S-shape or an inverted S-shape to be symmetric with respect to a rotation center as the central point of symmetry in a plane orthogonal to the rotation axis of the agitator. If such a configuration is adopted, the kneading apparatus can easily repeat a process in which the material is kneaded and beaten and falls under its own weight inside the kneading vessel. Thus, the S-shaped or inverted S-shaped array is suitable for increasing the kneading efficiency.

The agitating pins may rotate around rotation axes of the agitating pins that extend in the horizontal direction. If such a configuration is adopted, the material pressed against the agitating pins under the centrifugal force due to the revolution of the agitating pins can be drawn in by the rotation of the agitating pins and allowed to fall under its own weight. As a result, it is possible to improve the kneading efficiency of the material and reduce the kneading time of the material.

According to the present invention, the kneading efficiency can be enhanced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In the following, preferred embodiments of a kneading apparatus according to the present invention will be described in detail with reference to the drawings.

Figure 1:
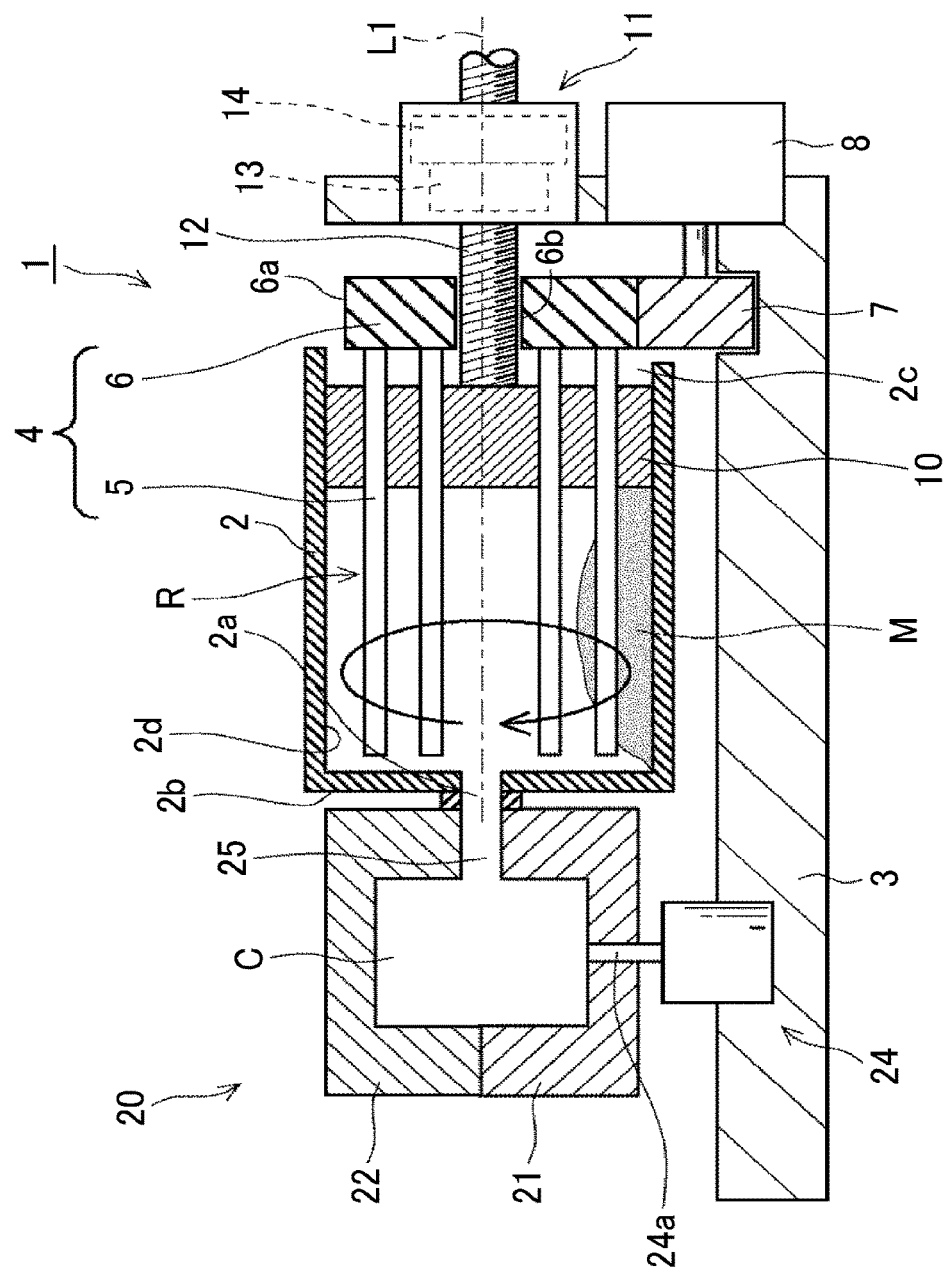
FIG. 1 is a sectional view showing a first embodiment of a kneading apparatus according to the present invention.

[First Embodiment] As shown in FIG. 1, a kneading apparatus 1 kneads together artificial sand, soluble glass, and an additive. An inorganic core is manufactured with a kneaded material M. The kneading apparatus 1 has a cylindrical kneading vessel 2, and the kneading vessel 2 is fixed on an installation stand 3 and extends in the horizontal direction. An agitator 4 is disposed inside the kneading vessel 2, and as the agitator 4 rotates, the material M can be kneaded inside the kneading vessel 2.

The agitator 4 includes a plurality of (e.g., ten) agitating pins 5 that rotate around a rotation axis L1 of the agitator 4 extending in the horizontal direction and that extend in the horizontal direction inside the kneading vessel 2, and a rotation base 6 provided on the base end side of the agitating pins 5. The rotation base 6 has the agitating pins 5 fixed thereon and a gear part 6a formed on the outer periphery. The rotation base 6 is disposed on the side of an opening 2c of the kneading vessel 2, and is meshed with a driving gear 7. The driving gear 7 is rotated by a motor 8 and thereby rotates the rotation base 6 around the rotation axis L1.

A columnar injection piston 10 that can move in the horizontal direction along the rotation axis L1 is disposed inside the kneading vessel 2. The injection piston 10 is penetrated by the agitating pins 5. Thus, the injection piston 10 can rotate with the agitator 4, and can slide in the direction of the rotation axis L1 inside the kneading vessel 2 without being influenced by the agitator 4.

A linear actuator 11 is mounted on the injection piston 10. The linear actuator 11 is composed of a ball screw shaft 12 extending in the direction of the rotation axis L1, a ball nut 13 screwed on the ball screw shaft 12, and a geared motor 14 that rotates the ball nut 13. The leading end of the ball screw shaft 12 is fixed at the center of the injection piston 10 so as to allow the injection piston 10 to rotate. When the ball nut 13 is rotated by the geared motor 14, the ball screw shaft 12 advances or retracts along the rotation axis L1, causing the injection piston 10 to advance or retract along the rotation axis L1 accordingly.

Figure 4:
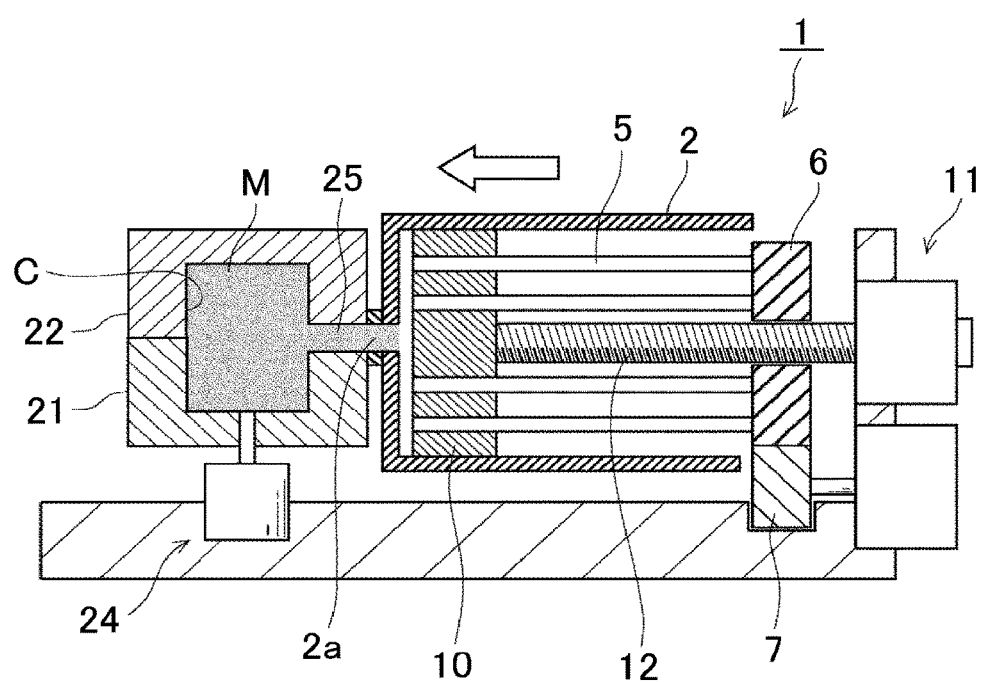
FIG. 4 is a sectional view showing a state in which a material is packed inside an injection mold.

On the installation stand 3, an injection mold 20 is disposed adjacent to the kneading apparatus 1. The injection mold 20 includes a lower mold 21 as a fixed mold, an upper mold 22 as a movable mold, and a piston cylinder mechanism 24 that pushes upward a molding product 23 (see FIG. 5) formed inside a cavity C to release the molding product 23 from the lower mold 21. The cavity C communicates with an injection port 2a provided in the kneading vessel 2 through a flow channel 25. The injection port 2a is provided at the center of a front end wall 2b of the kneading vessel 2. Accordingly, the material M extruded and injected through the injection port 2a by the injection piston 10 that moves in the horizontal direction by means of the linear actuator 11 is packed directly into the cavity C through the flow channel 25 (see FIG. 4).

If such a configuration is adopted, it is possible to inject the material M directly into the injection mold 20 without opening the kneading vessel 2, so that the material M is hardly exposed to external air and the material M can be prevented from drying. It is also possible to reduce the molding time.

Figure 5:
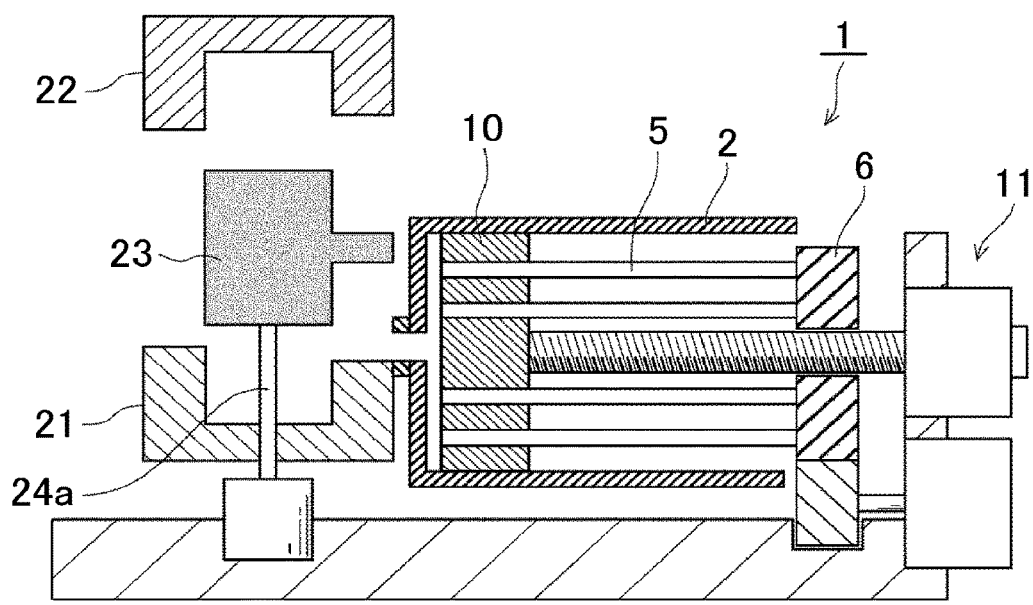
FIG. 5 is a sectional view showing a state in which a molding product has been taken out of the injection mold.

As shown in FIG. 5, after the material M packed inside the cavity has cured, the upper mold 22 is moved upward to open the mold. Thereafter, a piston 24a of the piston cylinder mechanism 24 is moved upward and the molding product 23 is pushed upward, so that the molding product 23 can be taken out.

Figure 2:
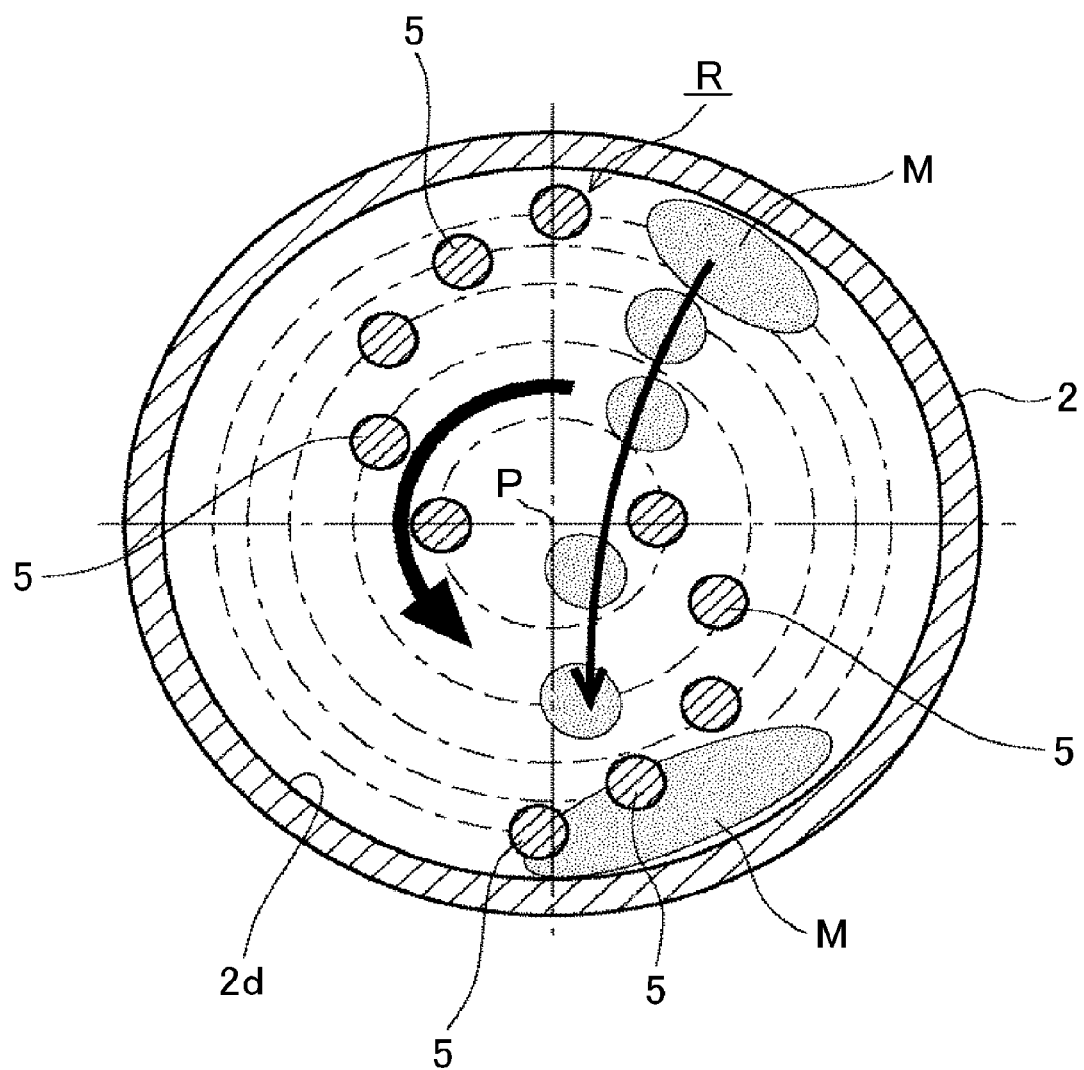
FIG. 2 is a sectional view showing a state of array of agitating pins.
Figure 3:
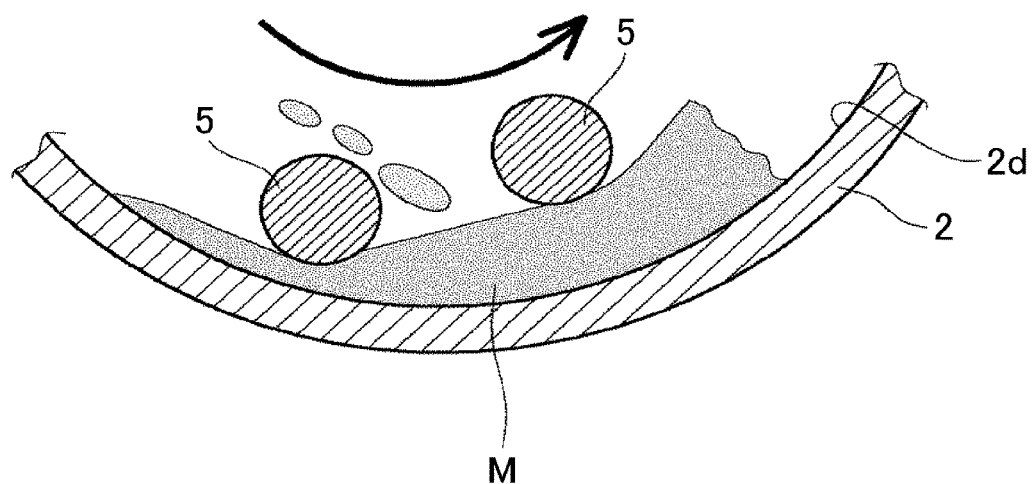
FIG. 3 is a sectional view showing a state of kneading by the agitating pins.

As shown in FIG. 2 and FIG. 3, the plurality of agitating pins 5 are arrayed in an S-shape or an inverted S-shape to be symmetric with respect to the rotation center as a central point P of symmetry in a plane orthogonal to the rotation axis L1. This array is S-shaped when the rotation direction is counterclockwise, and is inverted S-shaped when the rotation direction is clockwise. The plurality of (in this embodiment, ten) agitating pins 5 compose one row of pins R. The clearance between the kneading vessel 2 and the agitating pins 5 is preferably about several millimeters, and the diameter of each agitating pin 5 is preferably about 10 mm.

Due to the rotation of the agitating pins 5 that occurs as the agitating pins 5 rotate (revolve) around the rotation axis L1, the material M that has been flung up falls under its own weight. In this case, the material M falls to an inner wall surface 2d of the kneading vessel 2 while hitting the agitating pins 5. As shown in FIG. 3, the material M having fallen is kneaded and beaten between the inner wall surface 2d of the kneading vessel 2 and the agitating pins 5. With the agitating pins 5 thus arrayed, the kneading apparatus can easily repeat a process in which the material M is kneaded and beaten and falls under its own weight inside the kneading vessel 2, so that the kneading efficiency can be increased.

Since the agitating pins 5 employed in the kneading apparatus 1 extend in the horizontal direction in parallel to the rotation axis L1 and rotate around the rotation axis L1 extending in the horizontal direction, the kneading apparatus 1 can repeat the process in which the material M is kneaded and beaten against the inner wall surface 2d of the kneading vessel 2 and the material M adhering to the inner wall surface 2d of the kneading vessel 2, especially on the upper side from the rotation axis L1, falls under its own weight through the clearance between the agitating pins 5. As a result, the material hardly adheres to the inner wall surface 2d of the kneading vessel 2, so that the kneading efficiency can be enhanced.

[Second Embodiment] A kneading apparatus 30 according to a second embodiment will be described. Those components that are the same as or equivalent to the components of the first embodiment will be given the same reference signs and repeated description thereof will be omitted.

Figure 6:
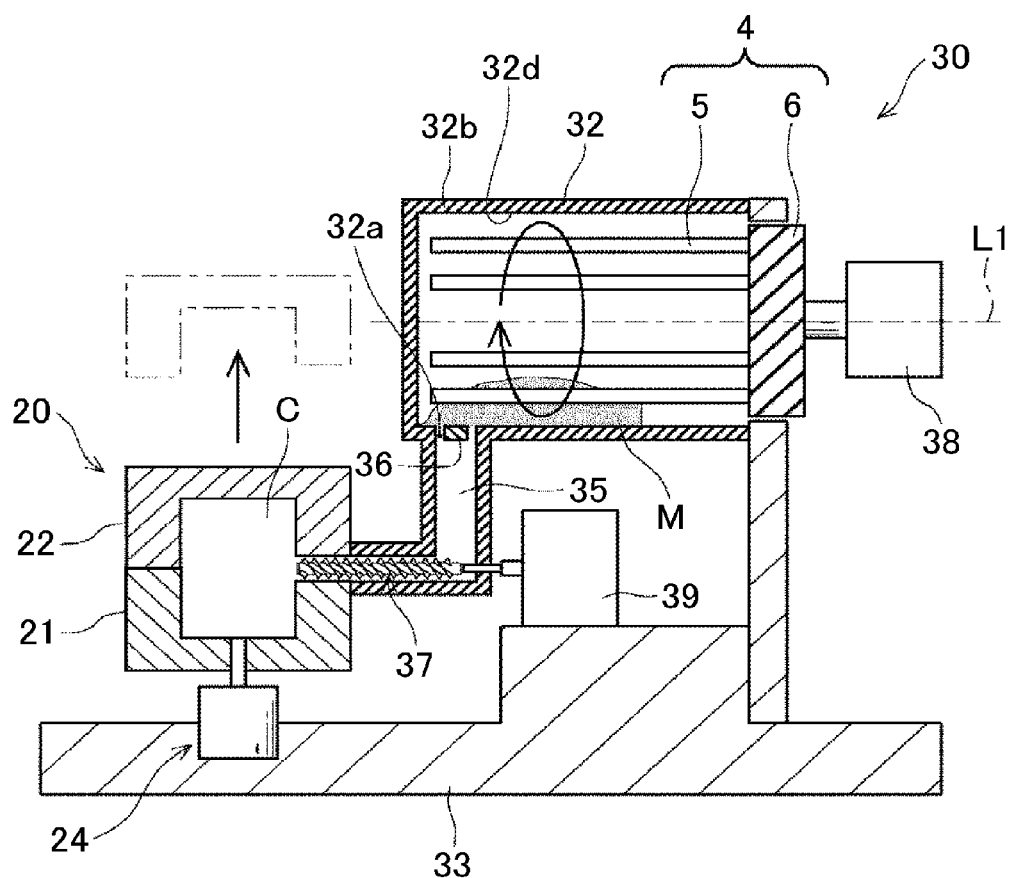
FIG. 6 is a sectional view showing a second embodiment of the kneading apparatus according to the present invention.

As shown in FIG. 6, the kneading apparatus 30 is used to knead together artificial sand, soluble glass, and an additive. An inorganic core is manufactured with the kneaded material M. The kneading apparatus 30 has a cylindrical kneading vessel 32, and the kneading vessel 32 is fixed on an installation stand 33 and extends in the horizontal direction. The agitator 4 is disposed inside the kneading vessel 32, and as the agitator 4 rotates, the material M can be kneaded through cooperation between the agitator 4 and an inner wall surface 32d of the kneading vessel 32.

As in the first embodiment, the agitator 4 includes the plurality of agitating pins 5 that are arrayed in an S-shape or an inverted S-shape to be symmetric with respect to the rotation center as the central point P of symmetry in a plane orthogonal to the rotation axis L1, and the rotation base 6 provided on the base end side of the agitating pins 5. The rotation base 6 is rotated around the rotation axis L1 by the driving force of a motor 38.

On the installation stand 33, the injection mold 20 is disposed adjacent to the kneading apparatus 30. The cavity C of the injection mold 20 communicates with a discharge port 32a provided in the kneading vessel 32 through a flow channel 35. The discharge port 32a is provided at a lowermost position of a shell 32b of the kneading vessel 32. A shutter 36 is disposed at the discharge port 32a. When the shutter 36 is closed, the material M can be kneaded inside the kneading vessel 32, and when the shutter 36 is opened, the material M after kneading can be discharged into the flow channel 35.

In the flow channel 35, a pressure feeding device (e.g., a screw conveyor 37) that pumps the material M into the cavity C is disposed. As a motor 39 of the screw conveyor 37 is driven, the material M is pumped into the cavity C of the injection mold 20. Instead of the screw conveyor 37, a diaphragm pump may be used.

[Third Embodiment] A kneading apparatus according to a third embodiment will be described. Those components that are the same as or equivalent to the components of the first embodiment will be given the same reference signs and repeated description thereof will be omitted. The third embodiment can also be implemented in the substantially same configuration as that of the second embodiment.

Figure 7:
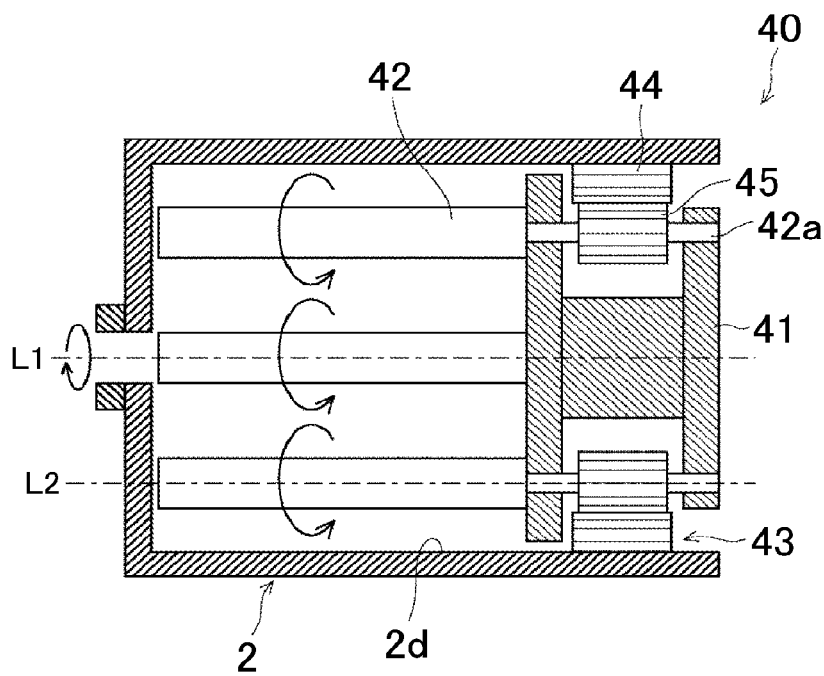
FIG. 7 is a sectional view showing a third embodiment of the kneading apparatus according to the present invention.

The kneading apparatus of this embodiment is configured such that the agitating pins rotate. As shown in FIG. 7, in a kneading apparatus 40, a rotation base 41 is rotated by a motor (not shown), and on the basis of the rotation of the rotation base 41, agitating pins 42 revolve around the rotation axis L1 and at the same time rotate around rotation axes L2 of the agitating pins 42. FIG. 7 is a simplified view in which the injection piston 10 etc. are omitted to clarify the configuration of the agitator. Here, the agitating pins 42 of this embodiment are disposed around the rotation axis L1 at 90° intervals in the rotation direction of the agitator (see FIG. 8), but the arrangement of the agitating pins 42 is not particularly limited.

Specifically, the kneading apparatus 40 includes a transmission unit 43 that transmits the rotary driving force of the rotation base 41 to the agitating pins 42 as a driving force that causes each of the agitating pins 42 to rotate. For example, the transmission unit 43 includes an internal gear 44 and a gear 45.

The internal gear 44 is provided on the inner wall surface 2d of the kneading vessel 2. The gear 45 is meshed with the internal gear 44 and fixed on a rotation shaft 42a of the agitating pin 42. The rotation shaft 42a of the agitating pin 42 extends along the rotation axis L2 and rotates around the rotation axis L2. The rotation shaft 42a of the agitating pin 42 is rotatably supported by the rotation base 41.

Figure 8:
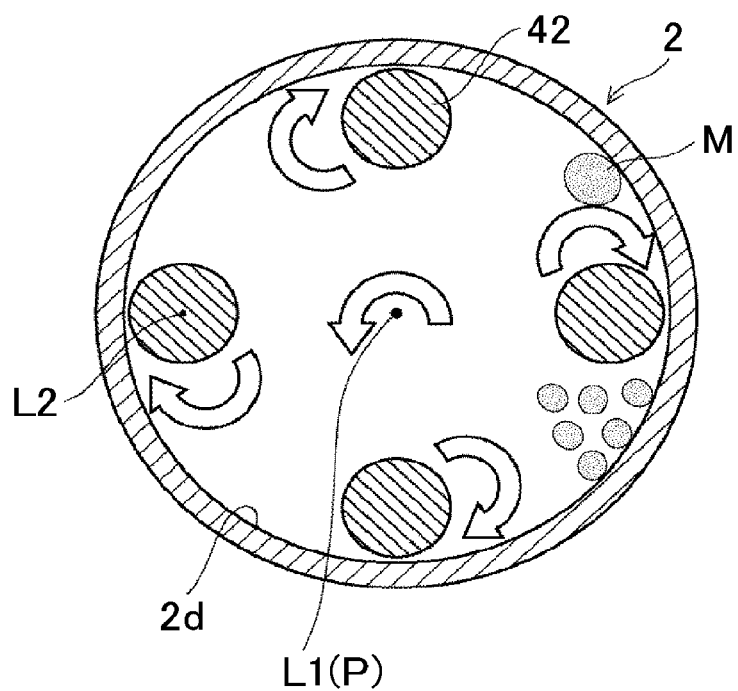
FIG. 8 is a sectional view schematically showing a rotating motion of an agitator and a state of kneading of a material.

Owing to this configuration, when the rotation base 41 is rotated by a motor (not shown), the gear 45 meshed with the internal gear 44 rotates, causing the agitating pin 42 to rotate around the rotation axis L2 accordingly. Thus, as shown in FIG. 8, the material M that is pressed against the agitating pins 42 under the centrifugal force due to the revolution of the agitating pins 42 can be drawn in by the rotation of the agitating pins 42 and allowed to fall under its own weight. As a result, it is possible to improve the kneading efficiency of the material M and reduce the kneading time of the material M.

While the transmission unit 43 is composed of the internal gear 44 and the gear 45 in this embodiment, the configuration of the transmission unit 43 is not limited to this example. For example, instead of the gear 45, a rotor that comes into contact with the inner wall surface of the kneading vessel 2 may be used. In this case, the internal gear 44 can be omitted.

Figure 9:
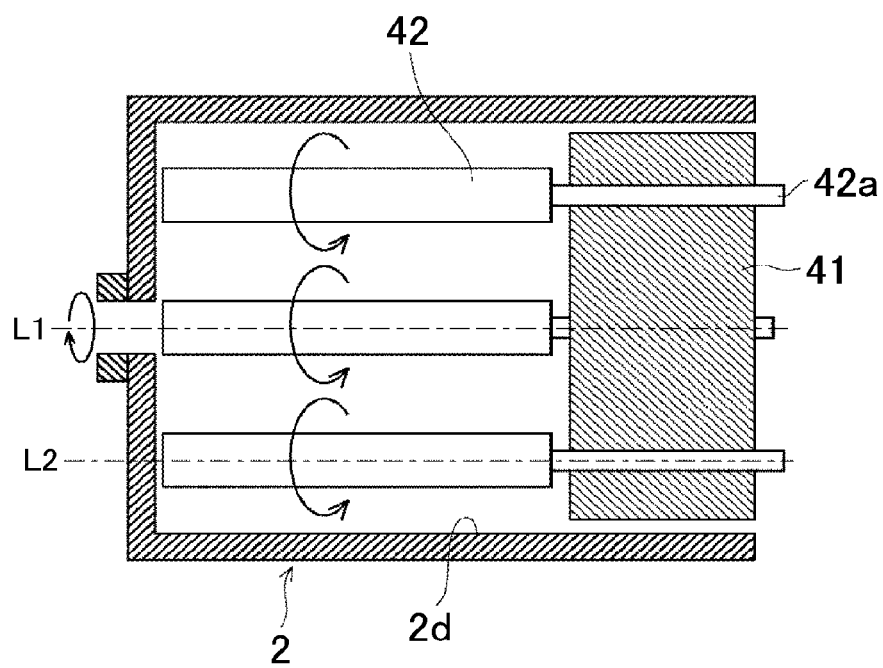
FIG. 9 is a sectional view showing a different form of the kneading apparatus according to the present invention

While the transmission unit 43 is used to actively rotate the agitating pins 42 in this embodiment, the configuration may be such that the transmission unit 43 is omitted and the agitating pins 42 rotate freely as shown in FIG. 9. In this case, the agitating pins 42 rotate on the basis of the flow of the material M.

[Fourth Embodiment] A kneading apparatus according to a fourth embodiment will be described. Those components that are the same as or equivalent to the components of the first embodiment etc. will be given the same reference signs and repeated description thereof will be omitted. The fourth embodiment can also be implemented in the substantially same configuration as that of the second embodiment.

Figure 10:
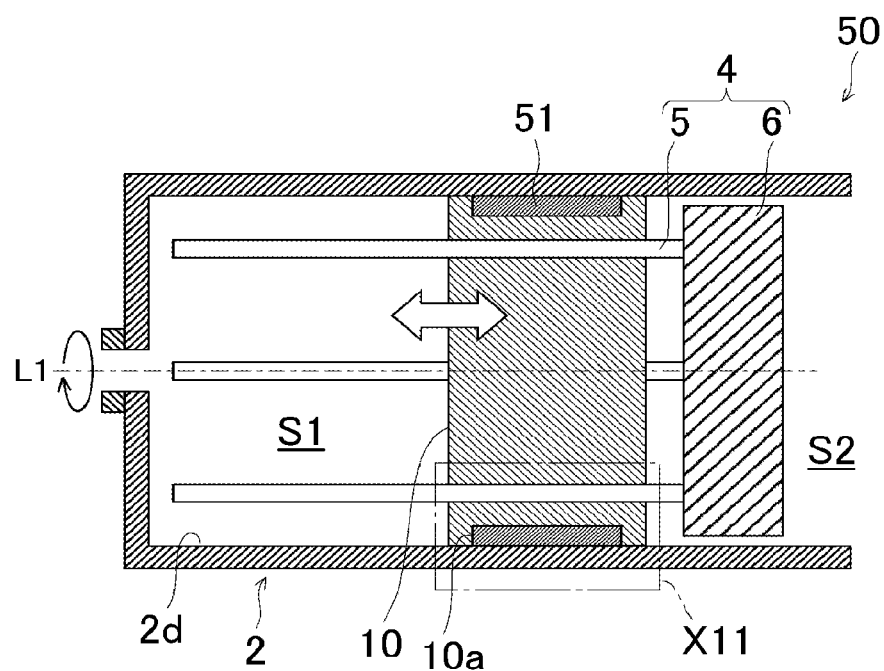
FIG. 10 is a sectional view showing a fourth embodiment of the kneading apparatus according to the present invention.

The kneading apparatus of this embodiment is configured such that damage to the injection piston can be prevented. As shown in FIG. 10, a kneading apparatus 50 includes a seal member 51 that is fitted in a groove 10a formed in the outer peripheral surface of the injection piston 10 (i.e., the surface facing the inner wall surface 2d of the kneading vessel 2), and that is disposed between the injection piston 10 and the inner wall surface 2d of the kneading vessel 2. FIG. 10 is a simplified view in which the linear actuator 11 etc. are omitted to clarify the configuration of the vicinity of the injection piston 10. Here, the agitating pins 5 of this embodiment are disposed around the rotation axis L1 at 90° intervals in the rotation direction of the agitator, but the arrangement of the agitating pins 5 is not particularly limited.

Figure 11:
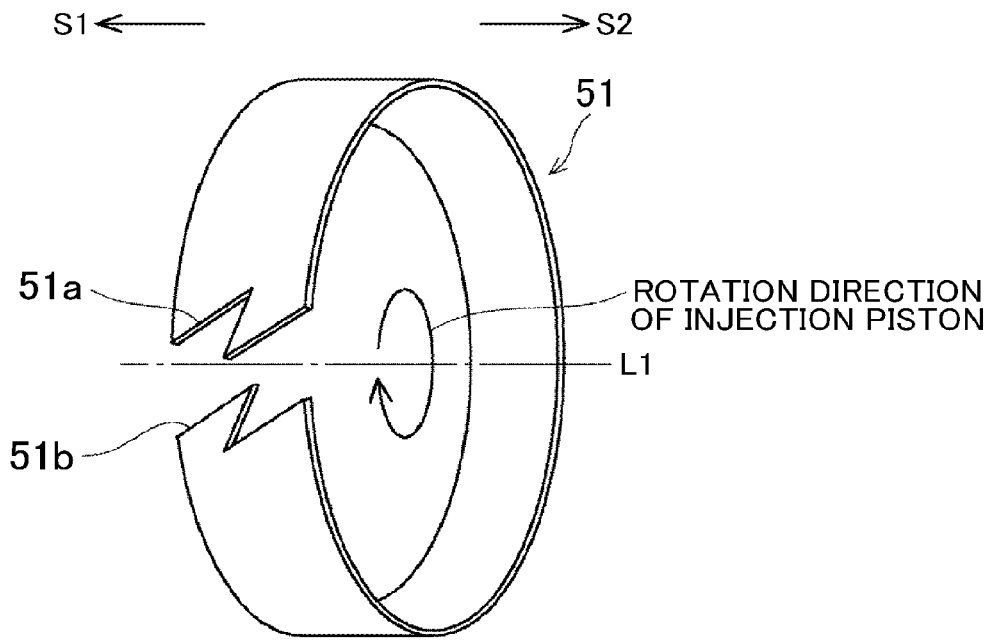
FIG. 11 is a perspective view schematically showing a seal member.

As shown in FIG. 11, the seal member 51 has a substantially cylindrical shape as the basic form, and is formed, for example, by winding a fluoroplastic sheet. The seal member 51 thus formed by winding a fluoroplastic sheet can have both durability and replaceability. However, the seal member 51 may be made of any material that can be wound into a substantially cylindrical shape.

The seal member 51 is divided in the circumferential direction of the seal member 51, and ends of the seal member 51 facing each other in the circumferential direction can be engaged with each other. For example, one end of the seal member 51 has a serrated shape formed by a sequence of a plurality of tapered portions 51a. On the other hand, the other end of the seal member 51 has a serrated shape formed by a sequence of a plurality of tapered portions 51b so that the one end and the other end of the seal member 51 can be meshed with each other. The tapered portions 51a, 51b incline in the opposite direction from the rotation direction of the injection piston 10 as extending toward a space S1 where the material M is kneaded in the kneading vessel 2.

Owing to such a configuration, the ridges at the one end of the seal member 51 and the valleys at the other end of the seal member 51 are meshed with each other, and the valleys at the one end of the seal member 51 and the ridges at the other end of the seal member 51 are meshed with each other.

Figure 12:
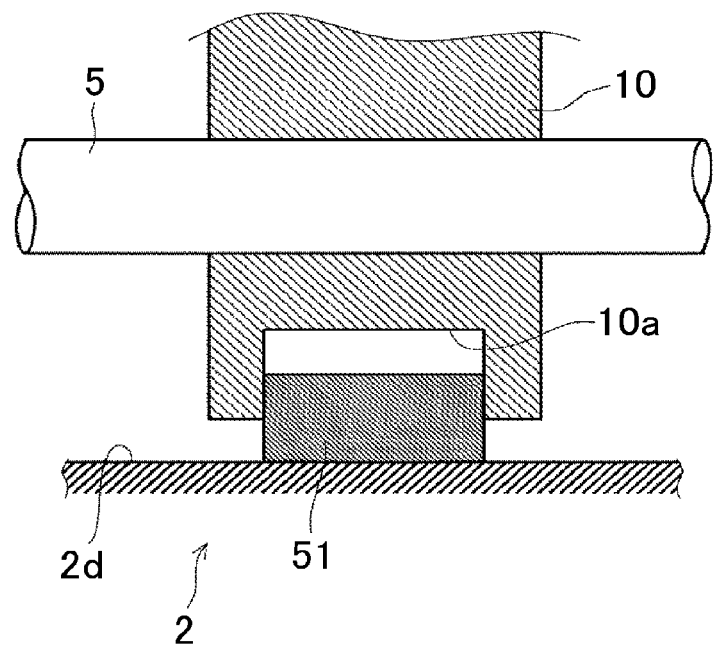
FIG. 12 is an enlarged view of the part XII of FIG. 10.

As shown in FIG. 12, in a state where the seal member 51 is fitted in the groove 10a of the injection piston 10 and disposed between the injection piston 10 and the inner wall surface 2d of the kneading vessel 2, and where the ends of the seal member 51 facing each other in the circumferential direction are meshed with each other, the outer peripheral surface of the seal member 51 comes into contact with the inner wall surface 2d of the kneading vessel 2, so that the seal member 51 is reduced in diameter and thereby exhibits a restoring force, which presses the outer peripheral surface of the seal member 51 against the inner wall surface of the kneading vessel 2. That is, the outer diameter of the seal member 51 in a state where the ends of the seal member 51 facing each other in the circumferential direction are meshed with each other is slightly larger than the inner diameter of the kneading vessel 2.

Here, in a state where the seal member 51 is fitted in the groove 10a of the injection piston 10 as described above, a clearance that allows the deflection of the seal member 51 should be secured between the inner peripheral surface of the seal member 51 and the bottom surface of the groove 10a of the injection piston 10.

With the seal member 51 thus fitted in the groove 10a of the injection piston 10, the material M can be prevented from entering the gap between the outer peripheral surface of the injection piston 10 and the inner wall surface 2d of the kneading vessel 2. Accordingly, damage to the injection piston 10 can be prevented.

Moreover, the tapered portions 51a, 51b of the seal member 51 of this embodiment incline in the opposite direction from the rotation direction of the injection piston 10 as extending toward the space Si where the material M is kneaded in the kneading vessel 2. Accordingly, when the injection piston 10 moves in the horizontal direction while rotating, the material M being likely to enter the gap between the outer peripheral surface of the injection piston 10 and the inner wall surface 2d of the kneading vessel 2 is pushed back by the rotary force of the injection piston 10 and the tapered portions of the seal member 51 toward the side of the injection port 2a of the kneading vessel 2. Thus, it is possible to prevent the material M from leaking from the engaging part of the seal member 51 to a space S2 that is on the opposite side of the injection piston 10 from the space Si in the kneading vessel 2.

Since the seal member 51 of this embodiment is pressed against the inner wall surface 2d of the kneading vessel 2 by the restoring force of the seal member 51, the material M can be further prevented from entering the gap between the outer peripheral surface of the injection piston 10 and the inner wall surface 2d of the kneading vessel 2. In this case, if the material M enters the gap between the seal member 51 and the inner wall surface 2d of the kneading vessel 2, the seal member 51 deflects and does not withstand more than necessary, so that damage to the inner wall surface 2d of the kneading vessel 2 can be prevented.

The present invention is not limited to the above embodiments, and various modifications as follows can be made within the scope of the present invention.

For example, the above embodiments may be combined with one another.

Figure 13A:
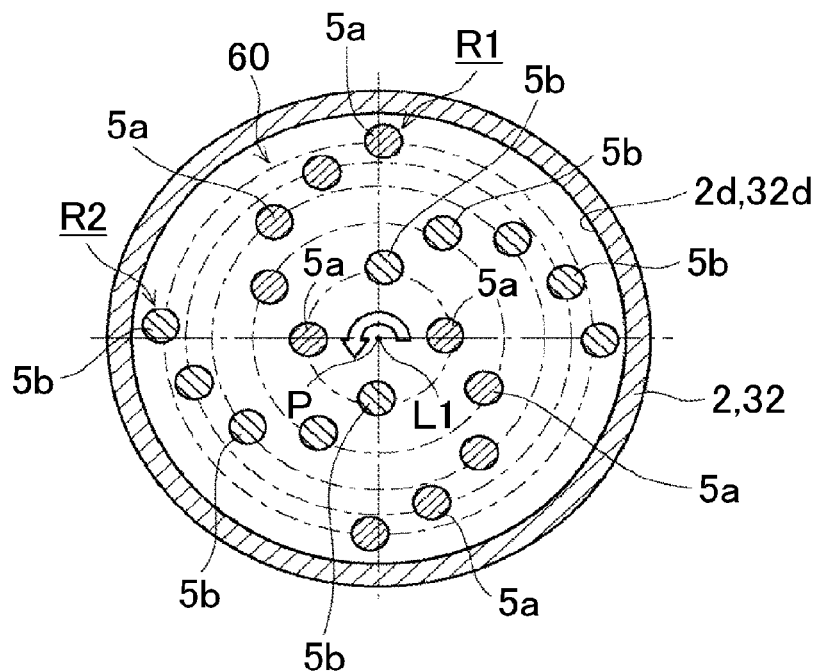
FIG. 13A is a sectional view showing another array of the agitating pins.

For example, as shown in FIG. 13A, an agitator 60 has two rows of pins R1, R2. The rows of pins R1, R2 are respectively composed of a plurality of (e.g., ten) agitating pins 5a, 5b that are arrayed in an S-shape or an inverted S-shape to be symmetric with respect to the rotation center as the central point P of symmetry in a plane orthogonal to the rotation axis L1. The one row of pins R1 and the other row of pins R2 are disposed to be equidistant in the circumferential direction of the kneading vessels 2, 32. The array of the agitating pins 5a, 5b in the rows of pins R1, R2 is S-shaped when the rotation direction of the agitator 60 is counterclockwise, and is inverted S-shaped when the rotation direction is clockwise.

Figure 13B:
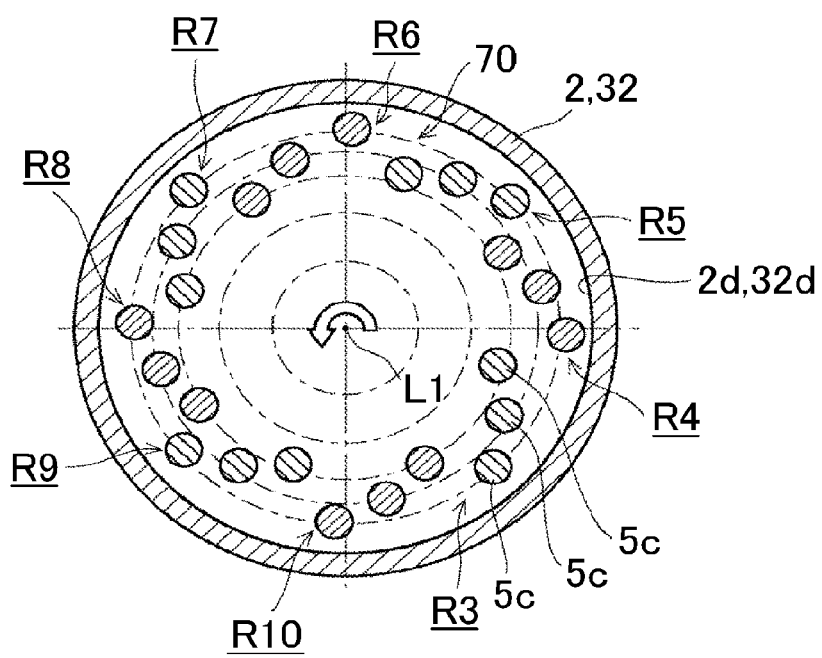
FIG. 13B is a sectional view showing another array of the agitating pins.

As shown in FIG. 13B, an agitator 70 has eight rows of pins R3 to R10. Each of the rows of pins R3 to R10 is composed of a plurality of (e.g., three) agitating pins 5c. The rows of pins R3 to R10 have such a shape that the distance from the inner wall surfaces 2d, 32d of the kneading vessels 2, 32 gradually increases in the rotation direction of the agitator 70 in a plane orthogonal to the rotation axis L1. Such rows of pins R3 to R10 are disposed at equal intervals in the circumferential direction inside the kneading vessels 2, 32.

Examples of the material to be kneaded include concrete and ingredients of confections.

What is claimed is:

1. A kneading apparatus comprising:
a kneading vessel;
an injection mold adjacent to the kneading vessel;
an injection piston disposed inside the kneading vessel;
a seal member that is disposed between the injection piston and an inner wall surface of the kneading vessel and fitted in the injection piston, wherein
ends of the seal member facing each other in a circumferential direction are engaged with each other, and
the ends of the seal member each have a serrated shape that extends out of a plane of rotation of the injection piston;
an agitator configured to be rotatably supported inside the kneading vessel to knead a material inside the kneading vessel, the agitator having a plurality of agitating pins that rotate around a rotation axis of the agitator and that extend parallel to the rotation axis of the agitator inside the kneading vessel, the rotation axis extending in a horizontal direction; and
a driving device that moves the injection piston along the agitating pins to extrude the material inside the kneading vessel in the horizontal direction toward the injection mold, wherein the agitating pins penetrate the injection piston.

2. The kneading apparatus according to claim 1, wherein the plurality of agitating pins are arrayed in an S-shape or an inverted S-shape to be symmetric with respect to a rotation center as a central point of symmetry in a plane orthogonal to the rotation axis of the agitator.

3. The kneading apparatus according to claim 1, wherein the agitating pins are configured to rotate around rotation axes of the agitating pins that extend in the horizontal direction.

4. The kneading apparatus according to claim 1, further comprising:
an internal gear provided on an inner wall surface of the kneading vessel;
a gear meshed with the internal gear and fixed on a rotation shaft of at least one of the agitating pins; and
a rotation base on which the gear meshed with the internal gear is fixed and which is configured to be rotatably supported.

5. A kneading apparatus comprising:
a kneading vessel;
an injection mold adjacent to the kneading vessel;
an injection piston disposed inside the kneading vessel;

a seal member that is disposed between the injection piston and an inner wall surface of the kneading vessel and fitted in the injection piston, wherein
ends of the seal member facing each other in a circumferential direction are engaged with each other, and
the ends of the seal member each have a serrated shape formed by a pair of tapered and inclined portions that extends out of a plane of rotation of the injection piston;
an agitator configured to be rotatably supported inside the kneading vessel to knead a material inside the kneading vessel, the agitator having a plurality of agitating pins that rotate around a rotation axis of the agitator and that extend parallel to the rotation axis of the agitator inside the kneading vessel, the rotation axis extending in a horizontal direction, and the agitator pins knead the material against an inside wall of the kneading vessel during rotation of the agitator; and
a driving device that moves the injection piston along the agitating pins to extrude the material inside the kneading vessel in the horizontal direction toward the injection mold, wherein the agitating pins penetrate the injection piston.

6. A kneading apparatus comprising:
a kneading vessel;
an injection mold adjacent to the kneading vessel;
an injection piston disposed inside the kneading vessel;
a seal member that is disposed between the injection piston and an inner wall surface of the kneading vessel and fitted in the injection piston, wherein
ends of the seal member facing each other in a circumferential direction are engaged with each other, and
the ends of the seal member each have a tapered and inclined portion that extends out of a plane of rotation of the injection piston;
an agitator configured to be rotatably supported inside the kneading vessel to knead a material inside the kneading vessel, the agitator having a plurality of agitating pins that rotate around a rotation axis of the agitator and that extend parallel to the rotation axis of the agitator inside the kneading vessel, the rotation axis extending in a horizontal direction; and
a driving device that moves the injection piston along the agitating pins to extrude the material inside the kneading vessel in the horizontal direction toward the injection mold, wherein the agitating pins penetrate the injection piston,
wherein the plurality of agitating pins are arrayed in an S-shape or an inverted S-shape to be symmetric with respect to a rotation center as a central point of symmetry in a plane orthogonal to the rotation axis of the agitator.

* * * * *